(12) United States Patent
Alverson et al.

(10) Patent No.: US 12,379,843 B2
(45) Date of Patent: Aug. 5, 2025

(54) CHIPSET ATTACHED RANDOM ACCESS MEMORY

(71) Applicant: Advanced Micro Devices, Inc., Santa Clara, CA (US)

(72) Inventors: William Robert Alverson, Del Valle, TX (US); Amitabh Mehra, Fort Collins, CO (US); Jerry Anton Ahrens, Sister Bay, WI (US); Grant Evan Ley, Eden, UT (US); Anil Harwani, Austin, TX (US); Joshua Taylor Knight, Georgetown, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/887,245

(22) Filed: Aug. 12, 2022

(65) Prior Publication Data

US 2024/0053891 A1    Feb. 15, 2024

(51) Int. Cl.
*G06F 3/06*    (2006.01)
*G06F 15/78*    (2006.01)

(52) U.S. Cl.
CPC ............ *G06F 3/061* (2013.01); *G06F 3/0655* (2013.01); *G06F 3/0673* (2013.01); *G06F 15/7803* (2013.01)

(58) Field of Classification Search
None
See application file for complete search history.

(56) References Cited

U.S. PATENT DOCUMENTS

| 6,338,119 | B1   |         | 1/2002  | Anderson et al. |                       |
|-----------|------|---------|---------|-----------------|-----------------------|
| 7,020,040 | B2   | *       | 3/2006  | Lin ...........  | G11C 7/20             |
|           |      |         |         |                 | 365/228               |
| 7,036,040 | B2   | *       | 4/2006  | Nicholson ...... | G06F 12/0862          |
|           |      |         |         |                 | 709/224               |
| 7,454,653 | B2   | *       | 11/2008 | Nicholson ...... | G06F 12/0866          |
|           |      |         |         |                 | 709/224               |
| 7,861,074 | B2   | *       | 12/2010 | Choi ........... | G06F 9/4411           |
|           |      |         |         |                 | 365/185.11            |
| 9,046,915 | B2   | *       | 6/2015  | Zheng .......... | G06F 3/00             |
| 9,250,999 | B1   | *       | 2/2016  | Barroso ........ | G06F 11/1064          |

(Continued)

FOREIGN PATENT DOCUMENTS

WO    20224035452 A1    2/2024

OTHER PUBLICATIONS

Nicholas et al., Machine Translation of Chinese Patent Application CN 101221544 A, published 2008. (Year: 2008).*

(Continued)

*Primary Examiner* — Steven G Snyder
(74) *Attorney, Agent, or Firm* — FIG. 1 Patents

(57) ABSTRACT

Random access memory (RAM) is attached to an input/output (I/O) controller of a chipset (e.g., on a motherboard). This chipset attached RAM is optionally used as part of a tiered storage solution with other tiers including, for example, nonvolatile memory (e.g., a solid state drive (SSD)) or a hard disk drive. The chipset attached RAM is separate from the system memory, allowing the chipset attached RAM to be used to speed up access to frequently used data stored in the tiered storage solution without reducing the amount of system memory available to an operating system running on the one or more processing units.

20 Claims, 6 Drawing Sheets

(56) References Cited

U.S. PATENT DOCUMENTS

| | | | |
|---|---|---|---|
| 9,852,055 B2* | 12/2017 | Arges | G06F 12/023 |
| 9,852,056 B2* | 12/2017 | Arges | G06F 12/023 |
| 9,910,466 B1* | 3/2018 | Strickland | H05K 7/1417 |
| 10,459,847 B1 | 10/2019 | Shah | |
| 11,262,924 B2 | 3/2022 | Alverson et al. | |
| 2002/0103987 A1* | 8/2002 | Jaffrey | G06F 9/4411 |
| | | | 712/32 |
| 2004/0107310 A1* | 6/2004 | Lin | G06F 1/30 |
| | | | 711/106 |
| 2004/0153694 A1* | 8/2004 | Nicholson | G06F 12/0862 |
| | | | 711/E12.019 |
| 2004/0177280 A1* | 9/2004 | Maruyama | G06F 21/31 |
| | | | 726/6 |
| 2007/0006021 A1* | 1/2007 | Nicholson | G06F 12/0866 |
| | | | 711/E12.019 |
| 2008/0008205 A1 | 1/2008 | Jung et al. | |
| 2008/0195854 A1* | 8/2008 | Choi | G06F 9/4411 |
| | | | 713/2 |
| 2010/0185815 A1 | 7/2010 | Caulkins | |
| 2011/0029723 A1 | 2/2011 | Lee et al. | |
| 2013/0003475 A1* | 1/2013 | Jenkins | G11C 7/1066 |
| | | | 365/193 |
| 2013/0033953 A1* | 2/2013 | Ge | G06F 1/26 |
| | | | 365/226 |
| 2013/0124800 A1* | 5/2013 | Priel | G06F 12/0877 |
| | | | 711/118 |
| 2013/0227196 A1* | 8/2013 | Zheng | G06F 8/654 |
| | | | 710/10 |
| 2013/0276123 A1* | 10/2013 | Thadikaran | G06F 21/56 |
| | | | 726/24 |
| 2015/0134929 A1* | 5/2015 | Anderson | G06F 3/0665 |
| | | | 711/170 |
| 2020/0320209 A1* | 10/2020 | Cohen | G06F 21/629 |

OTHER PUBLICATIONS

'VIA PT894 Chipset Reference Pentium 4 Motherboard Review' by C. Sun on PCStats, pp. 1,3,&8, Feb. 2, 2005. (Year: 2005).*

'Lecture Notes for Computation Structures' by the staff of M.I.T. 6.004, copyright 2015-2017 M.I.T. Department of Electrical Engineering and Computer Science, pp. 1-2,381-426. (Year: 2017).*

'IBM Enterprise X-Architecture Technology—Reaching the summit' copyright International Business Machines Corporation, 2002. (Year: 2002).*

'Cache-Oblivious Algorithms in Practice' by Olsen and Skov, Dec. 2, 2002. (Year: 2002).*

Hollis et al., 'Recent Evolution in the DRAM Interface' Jun. 24, 2019. (Year: 2019).*

'Where does NVRAM Fit?—The SSD Guy Blog' by Jim Handy, Aug. 15, 2014. (Year: 2014).*

PCT/US2023/020812 , "International Seach Report and Written Opinion", PCT Application No. PCT/US2023/020812, Aug. 24, 2023, 9 pages.

* cited by examiner

CHIPSET ATTACHED RANDOM ACCESS MEMORY

BACKGROUND

Computer games and other applications are regularly advancing, resulting in larger programs, higher resolution graphics, new features, and so forth. To address these advances, computer hardware is also advancing to provide new types of memory having faster data rates, faster clock rates, and so forth.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
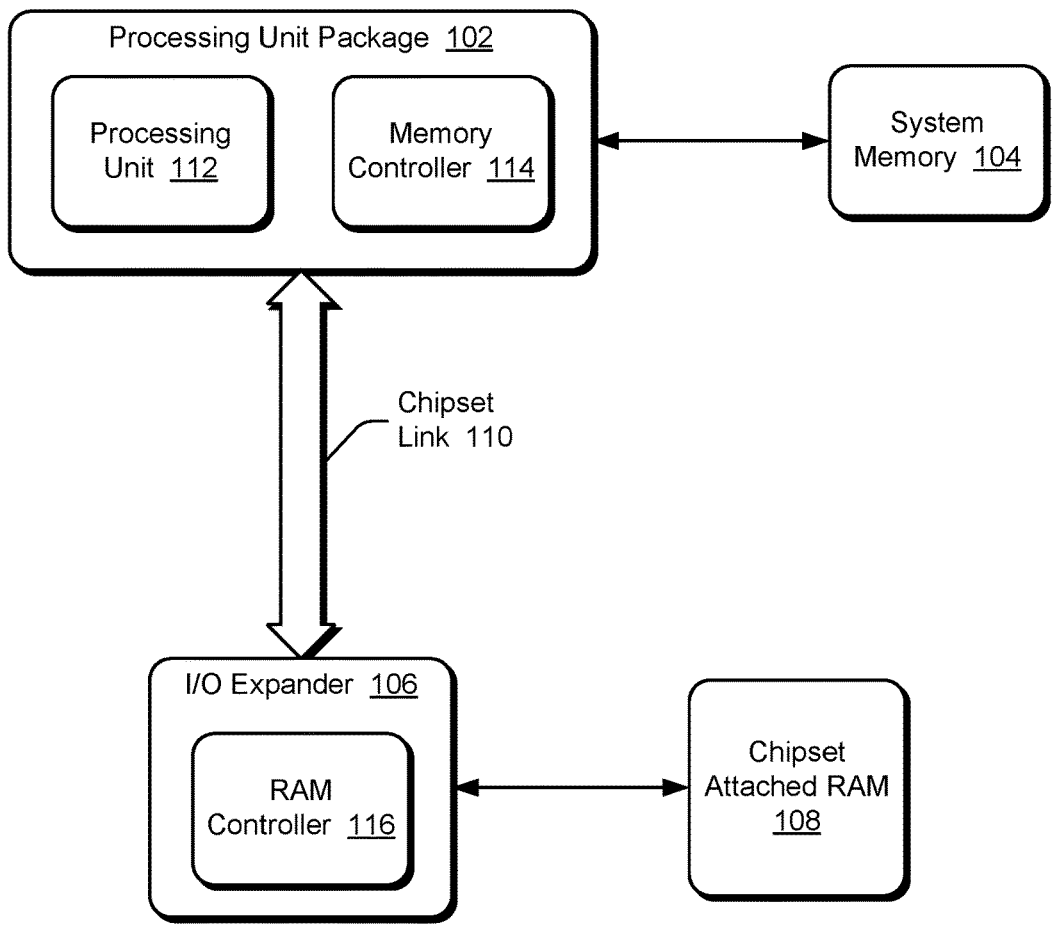
FIG. 1 is an illustration of a non-limiting example system that is operable to employ the chipset attached random access memory described herein.

A motherboard includes various components such as one or more sockets into which processing units are installed, one or more memory slots into which system memory is installed, one or more input/output (I/O) controllers to control access to nonvolatile memory or other storage devices, a chipset to allow these processing units, system memory, and other memory or storage devices to communicate with one another, and so forth. The one or more memory slots allow system memory (e.g., random access memory (RAM)) to be installed and accessed by processing units installed in the one or more sockets. However, one problem experienced with motherboards is that other uses of the system memory, such as to speed up access to frequently used data stored in a nonvolatile storage device, reduce the amount of system memory available to an operating system running on the one or more processing units.

The techniques discussed herein include attaching RAM to an I/O controller of the chipset. Accordingly, such RAM is also referred to as chipset attached RAM. The chipset attached RAM is optionally used as part of a tiered storage solution with other tiers including, for example, nonvolatile memory (e.g., a solid state drive (SSD)) or a hard disk drive. The chipset attached RAM is separate from the system memory, allowing, for example, the chipset attached RAM to be used to speed up access to frequently used data stored in the tiered storage solution without reducing the amount of system memory available to an operating system running on the one or more processing units.

In one or more implementations, the chipset attached RAM is implemented in a device as address space (e.g., a Peripheral Component Interconnect Express (PCIe) address space) that is addressable by other devices. This allows peer to peer access, such as allowing another device to remote access the chipset attached RAM. The chipset attached RAM is usable, by components of the device implementing the chipset attached RAM or other devices, for various operations, such as graphics processing operations, machine learning acceleration operations, artificial intelligence (AI) training operations, and so forth.

In some aspects, the techniques described herein relate to a system including: a processing unit package including a processing unit and a memory controller; a system memory coupled to the processing unit package, the memory controller being configured to read data from and write data to the system memory; an input/output expander including a random access memory controller; a chipset link coupling the processing unit package to the input/output expander; and a chipset attached random access memory coupled to the input/output expander, the random access memory controller being configured to read data from and write data to the chipset attached random access memory.

In some aspects, the techniques described herein relate to a system, wherein the system memory includes dynamic random access memory and the chipset attached random access memory includes dynamic random access memory.

In some aspects, the techniques described herein relate to a system, wherein the system memory includes double data rate 5 random access memory and the chipset attached random access memory include double data rate 4 random access memory.

In some aspects, the techniques described herein relate to a system, further including a chipset attached hard disk drive coupled to the input/output expander, and the chipset attached random access memory and the chipset attached hard disk drive collectively operating as a tiered storage solution accessed by the processing unit via the input/output expander.

In some aspects, the techniques described herein relate to a system, further including a chipset attached nonvolatile memory coupled to the input/output expander, and the chipset attached random access memory, the chipset attached nonvolatile memory, and the chipset attached hard disk drive collectively operating as the tiered storage solution accessed by the processing unit via the input/output expander.

In some aspects, the techniques described herein relate to a system, further including a network input/output controller coupled to the chipset attached random access memory and being configured to read data from and write data to the chipset attached random access memory.

In some aspects, the techniques described herein relate to a system, the chipset link including one or more peripheral component interconnect express lanes.

In some aspects, the techniques described herein relate to a system, wherein the system memory includes dynamic random access memory and the chipset attached random access memory includes nonvolatile memory.

In some aspects, the techniques described herein relate to a system including: a processing unit package socket into which a processing unit package including a processing unit and a memory controller is installable; one or more system memory slots into which system memory, controllable by the memory controller, is installable; an input/output expander including a random access memory controller; a chipset link coupling the processing unit package socket to the input/output expander; and one or more chipset attached random access memory slots coupled to the input/output expander, the random access memory controller being configured to read data from and write data to a chipset attached random access memory installed in the chipset attached random access memory slots.

In some aspects, the techniques described herein relate to a system, wherein the one or more system memory slots include one or more dynamic random access memory slots and the one or more chipset attached random access memory slots include one or more dynamic random access memory slots.

In some aspects, the techniques described herein relate to a system, wherein the one or more system memory slots include double data rate 5 random access memory slots and the one or more chipset attached random access memory slots include double data rate 4 random access memory slots.

In some aspects, the techniques described herein relate to a system, the input/output expander further including an input/output controller coupled to a chipset attached hard disk drive, and the chipset attached random access memory and the chipset attached hard disk drive collectively operating as a tiered storage solution accessed by the processing unit via the input/output expander.

In some aspects, the techniques described herein relate to a system, further including the input/output controller being coupled to a chipset attached nonvolatile memory, and the chipset attached random access memory, the chipset attached nonvolatile memory, and the chipset attached hard disk drive collectively operating as the tiered storage solution accessed by the processing unit via the input/output expander.

In some aspects, the techniques described herein relate to a system, wherein the one or more system memory slots include one or more dynamic random access memory slots and the one or more chipset attached random access memory slots include one or more nonvolatile memory slots.

In some aspects, the techniques described herein relate to a method including: receiving, at an input/output expander, access requests communicated from a processing unit to read data from a storage device coupled to the input/output expander; reading data from a chipset attached random access memory coupled to the input/output expander in accordance with the access requests; and responding to the access requests based on the data read from the chipset attached random access memory.

In some aspects, the techniques described herein relate to a method, the access requests further including requests to write data to the storage device, the method further including: writing data to the chipset attached random access memory coupled to the input/output expander in accordance with the access requests; and responding to the access requests based on the data written to the chipset attached random access memory.

In some aspects, the techniques described herein relate to a method, the storage device including a tiered storage solution including the chipset attached random access memory, a chipset attached nonvolatile memory, and a chipset attached disk drive.

In some aspects, the techniques described herein relate to a method, the method running on a computing device and further including presenting the tiered storage solution to an operating system running on the computing device as a single storage device.

In some aspects, the techniques described herein relate to a method, the method further including identifying first data read from the tiered storage solution more frequently than second data, and storing the first data in the chipset attached random access memory.

In some aspects, the techniques described herein relate to a method, the method running on a computing device and operating separately from an operating system running on the computing device.

FIG. 1 is an illustration of a non-limiting example system 100 that is operable to employ the chipset attached random access memory described herein. The system 100 includes a processing unit package 102, a system memory 104, an I/O expander 106, a chip set attached RAM 108, and a chipset link 110. The processing unit package 102, the system memory 104, the I/O expander 106, the chipset attached RAM 108, and the chipset link 110 are installed on or are part of, for example, a motherboard. In one or more implementations, the I/O expander 106 (including the RAM controller 116), the chip set link 110, one or more memory channels between the processing unit package 102 and the system memory 104, and one or more memory channels between the I/O expander 106 are also referred to as a chipset of a motherboard.

The processing unit package 102 includes a processing unit 112 and a memory controller 114. The processing unit 112 is any of various processing units, such as a central processing unit (CPU), a graphics processing unit (GPU), an Accelerated Processing Unit (APU), a parallel accelerated processor, an artificial intelligence (AI) or machine learning accelerator, and so forth. Although a single processing unit 112 is illustrated in the system 100, the processing unit package 102 optionally includes any number of processing units of the same or different types.

The system memory 104 is any of a variety of types of physical RAM. Examples of system memory 104 include dynamic random access memory (DRAM), phase-change memory (PCM), memristors, static random access memory (SRAM), and so forth. The system memory 104 is coupled or attached to the processing unit package 102 via one or more memory channels. The system memory 104 is packaged or configured in any of a variety of different manners. Examples of such packaging or configuring include a dual in-line memory module (DIMM), a small outline DIMM (SO-DIMM), a ball grid array (BGA), memory permanently attached to (e.g., soldered to) the motherboard, and so forth.

The memory controller 114 manages access to the system memory 104, sending read and write requests to the system memory 104 and receiving responses from the system memory 104. The system memory 104 is physical memory managed by an operating system running on the processing unit 112 (e.g., a CPU), such as by allocating portions of the system memory 104 to applications running on the processing unit 112, managing virtual memory spaces and memory pages for applications running on the processing unit 112, and so forth.

The processing unit package 102 optionally includes one or more additional controllers to link to additional devices, such as a Peripheral Component Interconnect Express (PCIe) controller, a Serial Advanced Technology Attachment (SATA) controller, a Universal Serial Bus (USB) controller, a Serial Peripheral Interface (SPI) controller, a Low Pin Count (LPC) controller, and so forth. Additionally or alternatively, one or more of these additional controllers is implemented separate from the processing unit package, such as in a chip (e.g., an integrated circuit optionally referred to as a north bridge) that is part of the chipset of a motherboard.

The processing unit package 102 communicates with the I/O expander 106 via the chipset link 110. The chipset link 110 is any of a variety of communication links, such as a high-speed bus. In one example the chipset link 110 is one or more PCIe lanes.

The I/O expander 106 includes a RAM controller 116. The I/O expander 106 optionally includes or is coupled to one or more additional controllers to link to other devices, such as a PCIe controller, a SATA controller, a USB controller, an SPI controller, an LPC controller, and so forth. In one or more implementations, the I/O expander 106 is referred to as a south bridge The RAM controller 116 manages access to the chipset attached RAM 108, sending read and write requests to the chipset attached RAM 108 and receiving responses from the chipset attached RAM 108. The chipset attached RAM 108 is referred to as "chipset attached" due to the chipset attached RAM 108 being attached to the I/O expander 106 rather than the processing unit package 102, and due to the chipset attached RAM 108 being controlled by a memory controller of the I/O expander 106 rather than a memory controller of the processing unit package 102. The chipset attached RAM 108 is coupled or attached to the I/O expander 106 via one or more memory channels.

The chipset attached RAM 108 is physical memory managed by an application or program other than an operating system running on the processing unit 112. The chipset attached RAM 108 is separate from the system memory 104, allowing the chipset attached RAM to be used in various manners, such as to speed up access to frequently used data, without reducing the amount of system memory 104 available to an operating system running on the processing unit 112.

The chipset attached RAM 108 is any of a variety of types of physical RAM. Examples of chipset attached RAM 108 include DRAM, PCM, memristors, SRAM, and so forth. The chipset attached RAM 108 is volatile memory or nonvolatile memory. The chipset attached RAM 108 is packaged or configured in any of a variety of different manners. Examples of such packaging or configuring include a DIMM, a SO-DIMM, a BGA, a 3-dimensional (3D) stacked memory, on-package memory (e.g., memory included in the I/O expander 106), memory permanently attached to (e.g., soldered to) the motherboard, and so forth.

The system 100 is implementable in any of a variety of different types of computing devices. For example, the system 100 is implementable in a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and so forth.

Figure 2:
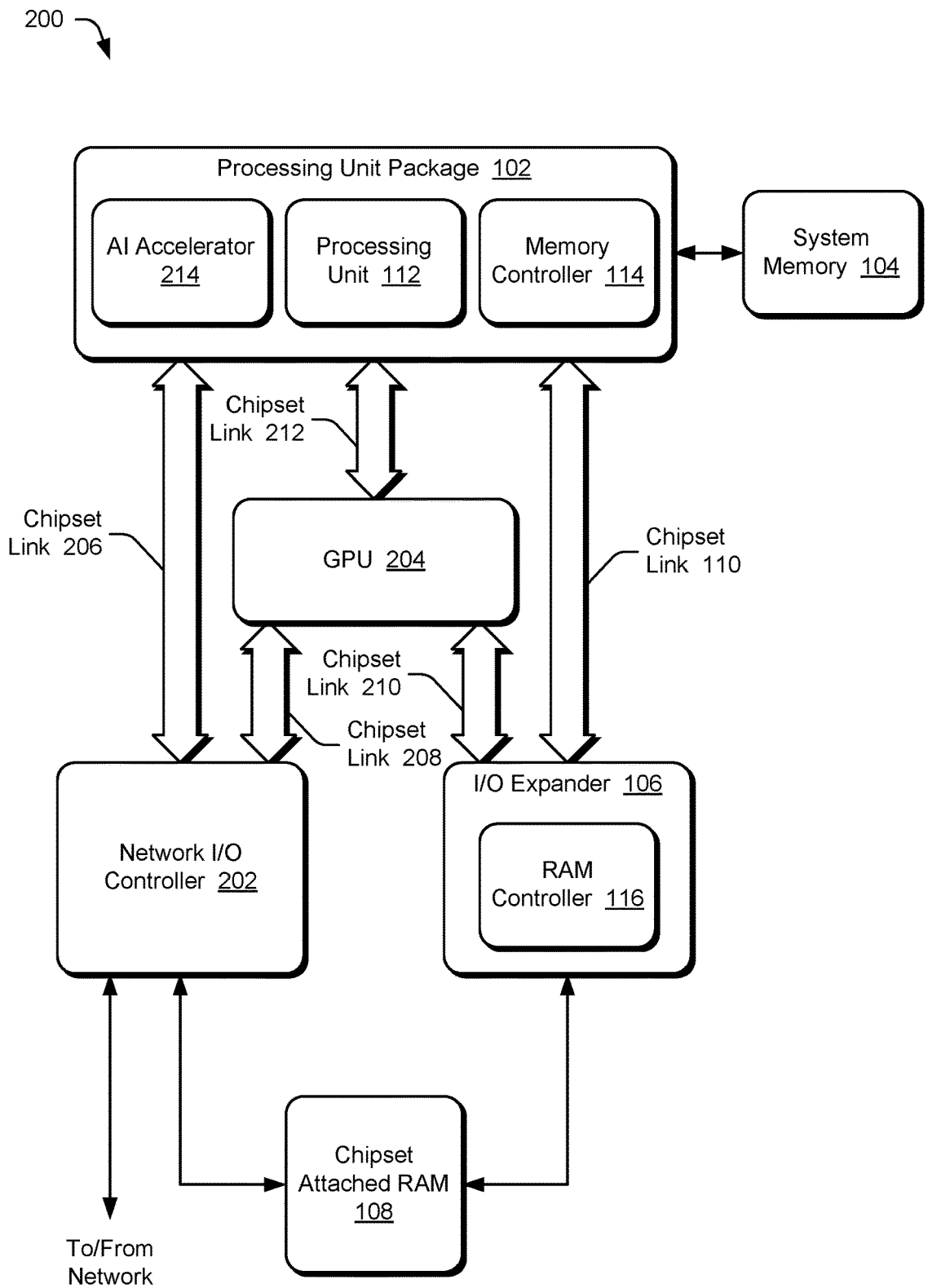
FIG. 2 is an illustration of another non-limiting example system that is operable to employ the chipset attached random access memory described herein.

FIG. 2 is an illustration of another non-limiting example system 200 that is operable to employ the chipset attached random access memory described herein. The system 200 includes the processing unit package 102, the system memory 104, the I/O expander 106, the chipset attached RAM 108, and the chipset link 110 analogous to the system 100 of FIG. 1. The system 200 also includes a network I/O controller 202, a GPU 204, a chipset link 206 allowing the processing unit package 102 to communicate with the network I/O controller 202 using any of a variety of communication links analogous to chipset link 110, a chipset link 208 allowing the GPU 204 to communicate with the network I/O controller 202 using any of a variety of communication links analogous to chip set link 110, a chip set link 210 allowing the GPU 204 to communicate with the I/O expander 106 using any of a variety of communication links analogous to chip set link 110, and a chipset link 212 allowing the GPU 204 to communicate with the processing unit package 102 using any of a variety of communication links analogous to chipset link 110.

The processing unit package 102, the system memory 104, the I/O expander 106, the chipset attached RAM 108, the chipset link 110, the network I/O controller 202, the GPU 204, the chipset link 206, the chipset link 208, the chipset link 210, and the chipset link 212 are installed on or are part of, for example, a motherboard. In one or more implementations, the I/O expander 106 (including the RAM controller 116), the chipset link 110, the chipset link 206, the chipset link 208, the chipset link 210, the chipset link 212, one or more memory channels between the processing unit package 102 and the system memory 104, and one or more memory channels between the I/O expander 106 are also referred to as a chipset of a motherboard.

The processing unit package 102 includes the processing unit 112, the memory controller 114, and an AI accelerator 214. Although a single processing unit 112 and AI accelerator 214 are illustrated in the system 200, the processing unit package 102 optionally includes any number of processing units of the same or different types. The AI accelerator 214 accesses the system memory 104 directly (e.g., via the memory controller 114) or through an operating system running on the processing unit 112. The AI accelerator 214 also accesses the chipset attached RAM 108 (e.g., via the I/O expander 106 or the network I/O controller 202).

The GPU 204 accesses the system memory 104 directly (e.g., via the memory controller 114) or through an operating system running on the processing unit 112. The GPU 204 also accesses the chipset attached RAM 108 (e.g., via the I/O expander 106 or the network I/O controller 202). Although a single GPU 204 is illustrated in the system 200, the system 200 optionally includes any number of GPUs or other processing units of the same or different types that are separate from the processing unit package 102 yet coupled to the network I/O controller 202, I/O expander 106, and processing unit package 102.

Thus, as illustrated in FIG. 2, the GPU 204 has access to a pool of memory (the chipset attached RAM 108) to perform any of various computations without disrupting the system memory 104.

The network I/O controller 202 manages communication over a network, sending data or control signals to one or more other devices via the network and receiving data or control signals from one or more other devices via the network. The network is implemented in any of a variety of manners, such as an Ethernet network, an InfiniBand network, and so forth. The network I/O controller 202 is also coupled or attached to the chipset attached RAM 108 via one or more memory channels. The chipset attached RAM 108 is address space (e.g., PCIe address space) that is addressable by other server nodes as well as components of the system 200 (e.g., the processing unit 112, the AI accelerator 214, the GPU 204). The network I/O controller 202 is thus able to send read and write requests to the chipset attached RAM 108 and receive responses from the chipset attached RAM 108, analogous to the RAM controller 116.

In one or more implementations the chipset attached RAM 108 is attached or coupled to only one of the network I/O controller 202 or the I/O expander 106 rather than attached or coupled to both the network I/O controller 202 and the I/O expander 106.

The network I/O controller 202 being attached or coupled to the chipset attached RAM 108 supports various different usage scenarios. In one or more implementations, the processing unit package 102 and GPU 204 are able to access the chipset attached RAM 108 via the network I/O controller 202, allowing the chipset attached RAM 108 to be used in situations where the chipset attached RAM 108 is not attached or coupled to the I/O expander 106. Such situations arise, for example, where board routing limitations prevent the chipset attached RAM 108 from being attached or coupled to the I/O expander 106.

In one or more implementations, the network I/O controller 202 allows the chipset attached RAM 108 to be accessed by other devices via the network. This access is allowed using any of a variety of public or proprietary remote direct memory access (RDMA) techniques. For example, assume the system 200 is implemented in a server node connected to multiple other server nodes (e.g., some including their own chip set attached RAM and optionally others not including their own chipset attached RAM). Another server node communicates read and write requests to the chipset attached RAM 108 via the network I/O controller 202 and receive responses from the chipset attached RAM 108 via the network I/O controller 202. The other server node is thus able to make use of the chipset attached RAM 108 without disrupting the system memory 104 or even the processing unit package 102. E.g., the processing unit package 102 need not have knowledge of the other server node accessing the chipset attached RAM 108.

By way of another example, assume the system 200 is implemented in a server node connected to multiple other server nodes, at least one of which includes its own chipset attached RAM. The GPU 204, processing unit 112, or AI accelerator 214 is able to communicate read and write requests to the chipset attached RAM of the other server node via the network I/O controller 202 and receive responses from the chipset attached RAM of the other server node via the network I/O controller 202. The GPU 204, processing unit 112, or AI accelerator 214 is thus able to make use of the chipset attached RAM of another sever node without disrupting the system memory 104 or the chipset attached RAM 108.

Figure 3:
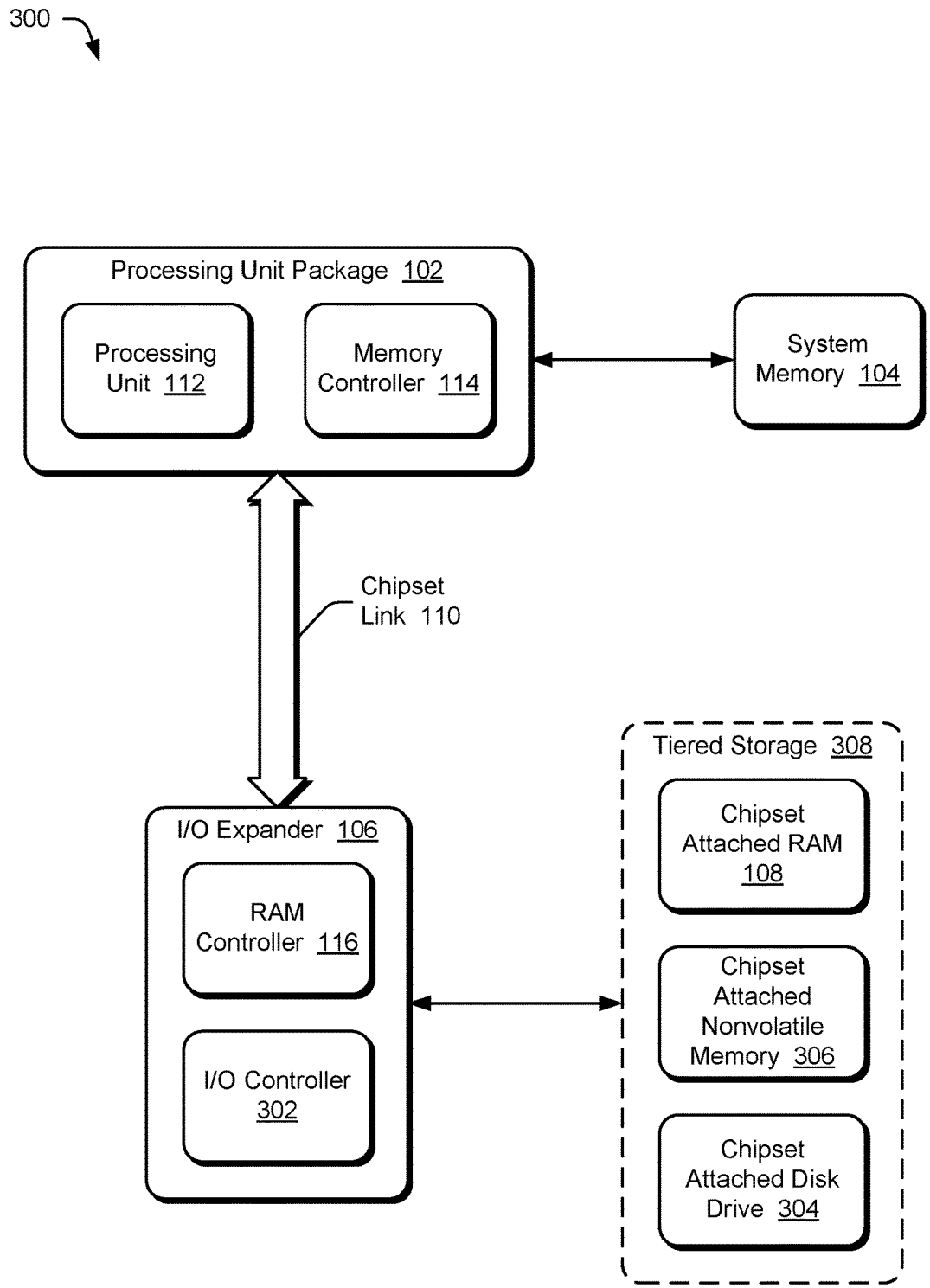
FIG. 3 is an illustration of another non-limiting example system that is operable to employ the chipset attached random access memory described herein.

FIG. 3 is an illustration of another non-limiting example system 300 that is operable to employ the chipset attached random access memory described herein. The system 300 includes the processing unit package 102, the system memory 104, the I/O expander 106, the chipset attached RAM 108, and the chipset link 110 analogous to the system 100 of FIG. 1. The processing unit package 102, the system memory 104, the I/O expander 106, the chipset attached RAM 108, and the chipset link 110 are installed on or are part of, for example, a motherboard. In one or more implementations, the I/O expander 106 (including the RAM controller 116 and the I/O controller 302), the chipset link 110, one or more memory channels between the processing unit package 102 and the system memory 104, and one or more memory channels between the I/O expander 106 are also referred to as a chipset of a motherboard. Although not illustrated in FIG. 3, in one or more implementations the system 300 includes a network I/O controller 202 of FIG. 2 that is coupled or attached to the chipset attached RAM 108.

The processing unit package 102 includes the processing unit 112 and the memory controller 114. Analogous to system 100 of FIG. 1, although a single processing unit 112 is illustrated in the system 100, the processing unit package 102 optionally includes any number of processing units of the same or different types.

The I/O expander 106 includes the RAM controller 116 as well as an I/O controller 302. The RAM controller 116 manages access to the chipset attached RAM 108, sending read and write requests to the chipset attached RAM 108 and receiving responses from the chipset attached RAM 108. Similarly, the I/O controller 302 manages access to other storage devices, illustrated as a chipset attached disk drive 304 and a chipset attached nonvolatile memory 306. Although illustrated as a single I/O controller managing access to both the chipset attached disk drive 304 and the chipset attached nonvolatile memory 306, additionally or alternatively the I/O expander 106 includes multiple I/O controllers, one of which manages access to the chipset attached disk drive 304 and another of which manages access to the chipset attached nonvolatile memory 306.

The chipset attached disk drive 304 is referred to as "chipset attached" due to the chipset attached disk drive 304 being attached to the I/O expander 106 rather than the processing unit package 102, and due to the chipset attached disk drive 304 being controlled by an I/O controller of the I/O expander 106 rather than an I/O controller of the processing unit package 102. Similarly, the chipset attached nonvolatile memory 306 is referred to as "chipset attached" due to the chipset attached nonvolatile memory 306 being attached to the I/O expander 106 rather than the processing unit package 102, and due to the chipset attached nonvolatile memory 306 being controlled by an I/O controller of the I/O expander 106 rather than an I/O controller of the processing unit package 102.

The chipset attached disk drive 304 is a hard disk drive (e.g., an electro-mechanical drive) and is attached to the I/O expander using any of various interfaces, such as via one or more PCIe lanes (e.g., using a nonvolatile memory express (NVMe) interface), a SATA or SATA III interface, and so forth. The chipset attached nonvolatile memory 306 is a drive made of nonvolatile memory (e.g., NAND flash memory) and is attached to the I/O expander using any of various interfaces, such as via one or more PCIe lanes (e.g., using an NVMe interface), a SATA interface, and so forth.

The chipset attached RAM 108, the chipset attached disk drive 304, and the chipset attached nonvolatile memory 306 are collectively referred to as a tiered storage 308, also referred to as a tiered storage solution. Different data is stored in different ones of the chipset attached RAM 108, the chipset attached disk drive 304, and the chipset attached nonvolatile memory 306 based on various criteria, such as a frequency with which the data is read from the tiered storage 308. For example, the chipset attached disk drive 304 typically provides the cheapest storage solution from a monetary standpoint (e.g., cost per gigabyte) but also the slowest storage solution (e.g., highest latency). The chipset attached nonvolatile memory 306 provides a more expensive but faster storage solution than the chipset attached disk drive 304. The chipset attached RAM 108 provides the most expensive but fastest solution relative to the chipset attached nonvolatile memory 306 and the chipset attached disk drive 304. Following this example, data that is read or otherwise accessed most frequently (e.g., by an operating system running on the processing unit 112) is stored in the chipset attached RAM 108 and data that is read or otherwise accessed least frequently (e.g., by an operating system running on the processing unit 112) is stored in the chipset attached disk drive 304.

In situations in which the chipset attached RAM 108 is volatile memory, data stored in the chipset attached RAM 108 is also stored in the chipset attached nonvolatile memory 306 or the chipset attached disk drive 304 so that the data is maintained if the system 300 is powered down or reset. In one or more implementations, such data is copied back to the chipset attached RAM 108 when the system 300 is subsequently powered up or restarts.

The RAM controller 116 provides read requests to the chipset attached RAM 108 and returns the read data to the requester (e.g., the processing unit 112 or the memory controller 114). The latency of chipset attached RAM 108 is less than that of either the chipset attached disk drive 304 or the chipset attached nonvolatile memory 306. Accordingly, in contrast to a write cache, data is read from the chipset attached RAM 108 faster than is doable when reading from the chipset attached nonvolatile memory 306 or the chipset attached disk drive 304.

The system 300 is implementable in any of a variety of different types of computing devices. For example, the system 300 is implementable in a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and so forth.

Figure 4:
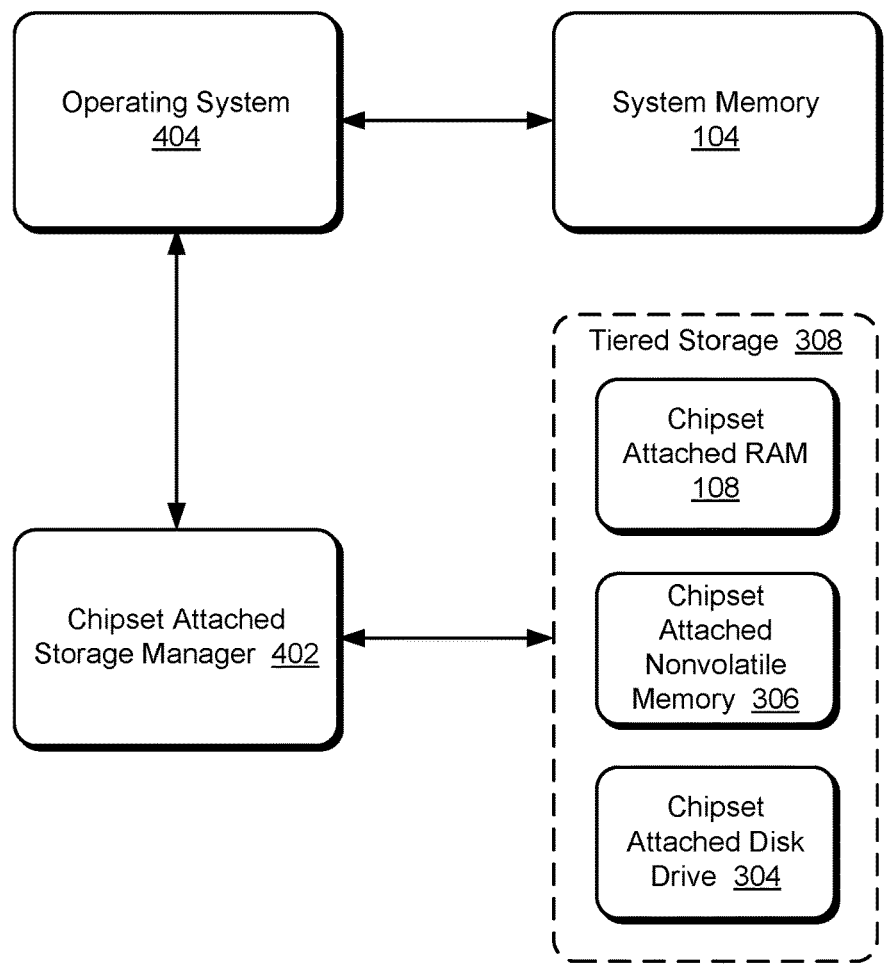
FIG. 4 illustrates an example of a storage architecture.

FIG. 4 illustrates an example of a storage architecture 400 using the system 300 of FIG. 3. The storage architecture 400 includes the tiered storage 308, a chipset attached storage manager 402, an operating system 404, and the system memory 104. The operating system 404 manages the system memory 104. This management takes any of various different forms, such as allocating portions of the system memory 104 to applications running on the processing unit 112, managing virtual memory spaces and memory pages for applications running on the processing unit 112, and so forth. As part of this memory management the operating system 404 also requests data from, and provides data to, the chipset attached storage manager 402 for storage in the tiered storage 308.

The chipset attached storage manager 402 runs separately from, and is not managed by, the operating system 404. In one or more implementations, the chipset attached storage manager 402 is firmware that is loaded and run during startup of a device including the system 300 prior to running the operating system 404.

The chipset attached storage manager 402 manages the tiered storage 308, and in one or more implementations presents the tiered storage 308 to the operating system 404 as a single storage device. For example, the operating system 404 need have no knowledge of the types of storage devices in the tiered storage 308, need have no knowledge of the storage capacities of the individual storage devices in the tiered storage 308, need have no knowledge that the tiered storage 308 includes the chipset attached RAM 108, and so forth.

In one or more implementations, the chipset attached storage manager 402 monitors accesses to data stored in the tiered storage 308 (e.g., data read from the tiered storage 308). The chipset attached storage manager 402 identifies data that is accessed more frequently than other data, also referred to as hot data. The chipset attached storage manager 402 stores data that is accessed more frequently than other data in faster portions of the tiered storage 308 than data that is accessed less frequently. For example, the chipset attached storage manager 402 stores the data accessed most frequently in the RAM 108, stores the next most frequently accessed data in the chipset attached nonvolatile memory 306, and stores the remaining data (e.g., the data that is accessed least frequently) in the chipset attached disk drive 304.

The chipset attached storage manager 402 receives, from the operating system 404, requests to access the tiered storage 308. These access requests include requests to read data from the tiered storage 308 as well as to write data to the tiered storage 308. The chipset attached storage manager 402 performs the requested accesses and returns the appropriate responses to the operating system 404 based on the access requests.

Figure 5:
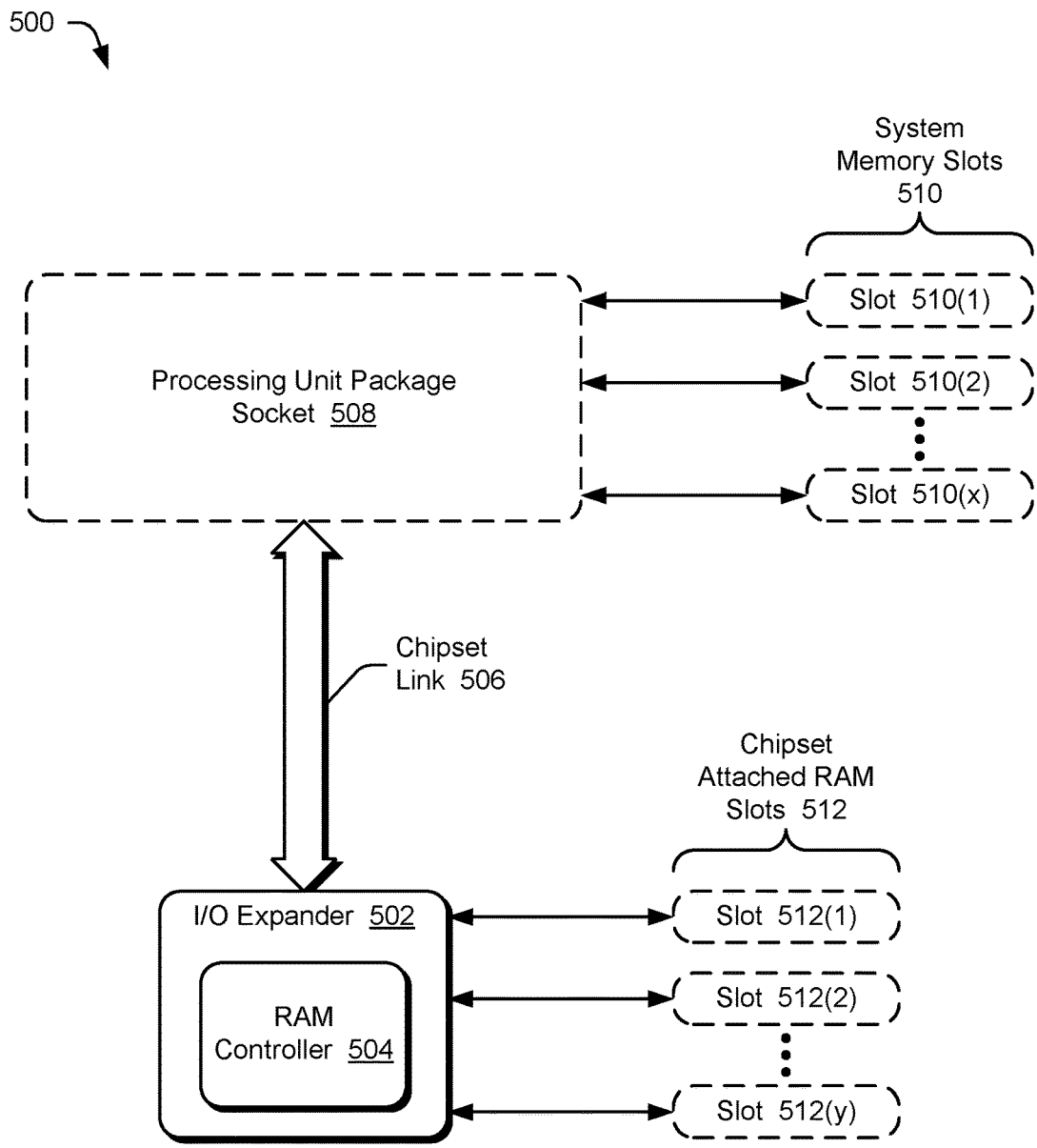
FIG. 5 is an illustration of another non-limiting example system that is operable to employ the chipset attached random access memory described.

FIG. 5 is an illustration of another non-limiting example system 500 that is operable to employ the chipset attached random access memory described. The system 500 is, for example, a motherboard. The system 500 includes an I/O expander 502 that includes a RAM controller 504, and a chipset link 506. The system 500 also includes a processing unit package socket 508, system memory slots 510, and chipset attached RAM slots 512. The processing unit package socket 508 is designed to have a processing unit package, such as the processing unit package 102 of FIG. 1, FIG. 2 or FIG. 3, installed or inserted therein. In one or more implementations, the I/O expander 502 (including the RAM controller 504), the chipset link 506, one or more memory channels between the processing unit package socket 508 and the system memory slots 510, and one or more memory channels between the I/O expander 502 and the chipset attached RAM slots 512 are also referred to as a chipset of a motherboard.

The I/O expander 502 is an I/O expander analogous to the I/O expander 106 of FIG. 1, FIG. 2, or FIG. 3. The RAM controller 504 is a RAM controller analogous to the RAM controller 116 of FIG. 1, FIG. 2, or FIG. 3. The chipset link 506 is analogous to the chipset link 110 of FIG. 1, FIG. 2, or FIG. 3.

The system memory slots 510 include multiple ("x") memory slots 510(1), 510(2), . . . , 510(x). The system memory slots 510 are designed to have system memory, such as the system memory 104 of FIG. 1, FIG. 2, or FIG. 3, installed or inserted therein. The system memory slots 510 are, for example, DIMM or SO-DIMM slots. Although multiple memory slots 510(1), 510(2), . . . , 510(x) are illustrated, the system 500 optionally includes a single memory slot 510 or any other number of memory slots 510.

The chipset attached RAM slots 512 include multiple ("y") slots 512(1), 512(2), . . . , 512(x). The chipset attached RAM slots 512 are designed to have chipset attached RAM, such as the chipset attached RAM 108 of FIG. 1, FIG. 2, or FIG. 3, installed or inserted therein. The chipset attached RAM slots 512 are, for example, DIMM or SO-DIMM slots. Although multiple memory slots 512(1), 512(2), . . . , 512(x) are illustrated, the system 500 optionally includes a single memory slot 512 or any other number of memory slots 512.

With a processing unit package installed or inserted in the processing unit package socket 508, system memory installed or inserted in the system memory slots 510, chipset attached RAM installed or inserted in the chip set attached RAM slots 512, and additional I/O devices (e.g., the chipset attached nonvolatile memory 306 or the chip set attached disk drive 304 of FIG. 3) optionally installed or otherwise coupled to the I/O expander 502, the system 500 becomes the system 100 of FIG. 1 or the system 300 of FIG. 3.

The techniques discussed herein support various different usage scenarios. In one or more implementations, the system memory 104 and the chipset attached RAM 108 are two different generations or versions of the same type of RAM. For example, the system memory 104 is a current version of double data rate (DDR) RAM, such as DDR5, whereas the chipset attached RAM 108 is a previous version of DDR RAM, such as DDR4. Thus, when a new generation or version of DDR RAM becomes available, a user is able to get the benefit of the improved newer generation or version as their system memory and use the previous generation or version (which they oftentimes already have) as their chipset attached RAM. Despite the lower performance of the previous generation or version relative to the current generation or version, the previous generation or version of DDR RAM is still higher performance (e.g., lower latency) than nonvolatile memory (e.g., the chipset attached nonvolatile memory 306) or a hard drive (e.g., chipset attached disk drive 304).

In one or more implementations, the RAM controller 116 of FIG. 3 uses the chipset attached RAM 108 to store the most frequently accessed data as discussed above. Additionally or alternatively, the RAM controller 116 uses the chipset attached RAM 108 for other purposes. In one example usage scenario, the I/O expander 106 receives audio/video content from an external source, such as the Internet. The audio/video content is temporarily stored in the chipset attached RAM 108 at a higher rate then transferred to the chipset attached disk drive 304 at a slower rate over time for longer term storage. This allows large amounts of audio/video content to be received via a high-speed Internet connection and temporarily stored in the chipset attached RAM 108 while other audio/video data from the chipset attached disk drive 304 is provided to the processing unit package 102 for playback. As the audio/video content received via the Internet is temporarily stored in the chip set attached RAM 108, receipt and storage of the audio/video content does not introduce any latency into the chipset attached disk drive 304 that negatively affects the user experience in consuming the audio/video content.

Additionally or alternatively, the RAM controller 116 supports direct memory access (DMA). DMA allows a component of the device to directly access memory without involving the CPU or an operating system running on the CPU. In one example, the chipset attached storage manager 402 communicates with a GPU directly, not involving the CPU or an operating system running on the CPU. This allows data to be directly transferred between the GPU and the chipset attached RAM 108 (or other parts of the tiered storage 308, such as the chipset attached nonvolatile memory 306), freeing the CPU and an operating system running on the CPU from the burden of managing the data transfer.

Additionally or alternatively, the chipset attached storage manager 402 of FIG. 4 performs various operations on data stored in the chip set attached RAM 108. These operations are in addition to reading data from the chipset attached RAM 108 or writing data to the chipset attached RAM 108. Performing these operations on the data in the chipset attached RAM 108 frees the CPU and an operating system running on the CPU from the burden of performing the operations. In one example, the chipset attached storage manager 402 decompresses data stored in the chipset attached RAM 108 and stores the decompressed data in the chipset attached RAM 108 or elsewhere (e.g., another part of the tiered storage 308, such as the chipset attached nonvolatile memory 306). In another example, the chipset attached storage manager 402 decrypts data stored in the chipset attached RAM 108 and stores the decrypted data in the chipset attached RAM 108 or elsewhere (e.g., another part of the tiered storage 308, such as the chipset attached nonvolatile memory 306).

Figure 6:
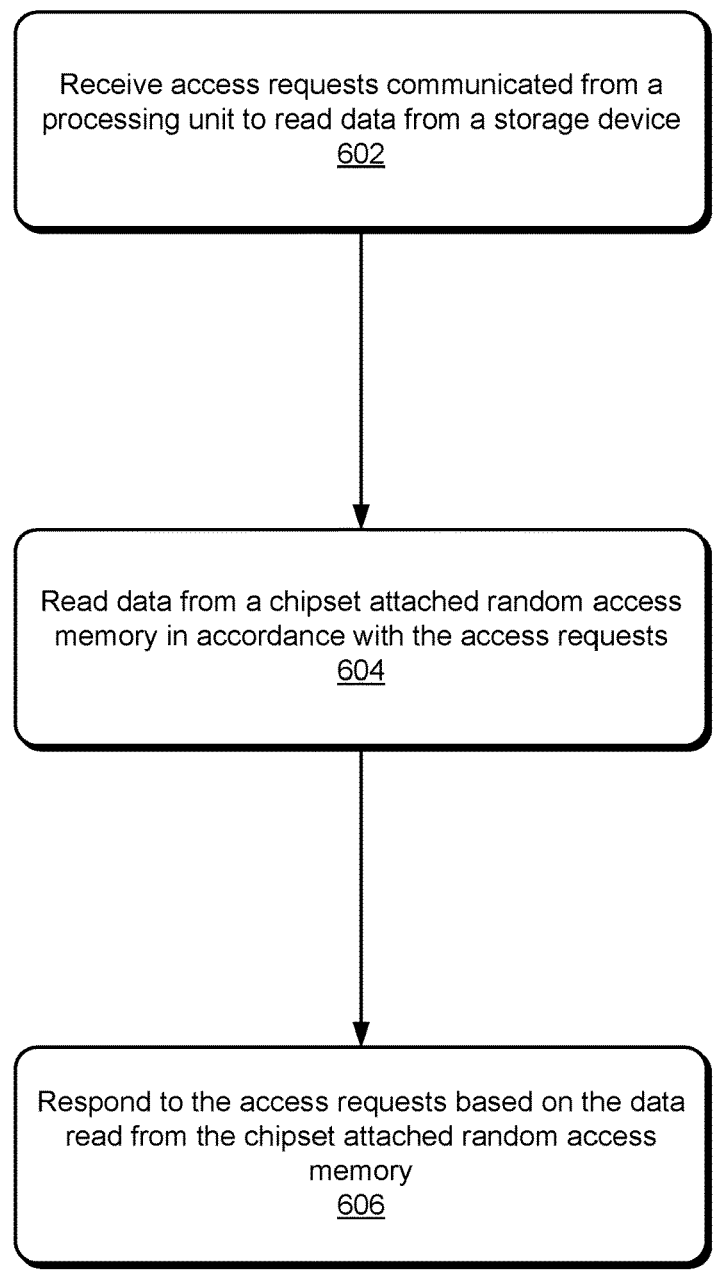
FIG. 6 is a flow diagram depicting a procedure in an example implementation of using a chipset attached random access memory.

FIG. 6 is a flow diagram 600 depicting a procedure in an example implementation of using a chipset attached random access memory. The flow diagram 600 is performed, for example, by RAM controller 116 of FIG. 1, FIG. 2, or FIG. 3, by a chipset attached storage manager 402 of FIG. 4 using a RAM controller 116 of FIG. 1, FIG. 2, or FIG. 3, or by a network I/O controller 202 of FIG. 2.

In this example, access requests communicated from a processing unit to read data from a storage device are received (block 602). The access requests are received, for example, at an input/output expander of a chipset on a motherboard. The access requests also optionally includer requests to write data to the storage device.

Data is read from a chipset attached random access memory in accordance with the access requests (block 604). The chipset attached random access memory is coupled to the input/output expander, and data is read from the chipset attached random access memory in response to a read access request and written to the chipset attached random access memory in response to a write access request.

The access request is responded to based on the data read from the chipset attached random access memory (block 606). For a write access request, the access request is responded to based on the data written to the chipset attached random access memory (e.g., the response includes an acknowledgement of the data that was written).

It should be understood that many variations are possible based on the disclosure herein. Although features and elements are described above in particular combinations, each feature or element is usable alone without the other features and elements or in various combinations with or without other features and elements.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A system comprising:
  a processing unit package including a processing unit and a memory controller;
  a system memory coupled to the processing unit package, the system memory including a dynamic random access memory, the memory controller being configured to read data from and write data to the system memory;

an input/output expander including a random access memory controller;
a chipset link coupling the processing unit package to the input/output expander; and
a chipset attached dynamic random access memory directly coupled to the input/output expander and separate from the system memory, the chipset attached dynamic random access memory controlled by the random access memory controller.

2. The system of claim 1, wherein the dynamic random access memory of the system memory includes a first version of double data rate random access memory and the chipset attached dynamic random access memory includes a second version of double data rate random access memory.

3. The system of claim 2, wherein the first version of double data rate random access memory includes an improved version of the second version of double date rate random access memory.

4. The system of claim 1, further comprising a chipset attached hard disk drive coupled to the input/output expander, and the chipset attached dynamic random access memory and the chipset attached hard disk drive collectively operating as a tiered storage solution accessed by the processing unit via the input/output expander.

5. The system of claim 4, further comprising a chipset attached nonvolatile memory coupled to the input/output expander, and the chipset attached dynamic random access memory, the chipset attached nonvolatile memory, and the chipset attached hard disk drive collectively operating as the tiered storage solution accessed by the processing unit via the input/output expander.

6. The system of claim 1, further comprising a network input/output controller coupled to the chipset attached dynamic random access memory and being configured to read data from and write data to the chipset attached dynamic random access memory.

7. The system of claim 1, the chipset link including one or more peripheral component interconnect express lanes.

8. The system of claim 1, wherein the processing unit is a central processing unit.

9. The system of claim 1, wherein the processing unit is a graphics processing unit.

10. The system of claim 1, wherein the chipset attached dynamic random access memory is controlled exclusively by the random access memory controller.

11. A system comprising:
a processing unit package socket into which a processing unit package including a processing unit and a memory controller is installable;
one or more system memory slots into which system memory, controllable by the memory controller, is installable;
an input/output expander including a random access memory controller;
a chipset link coupling the processing unit package socket to the input/output expander; and
one or more chipset attached random access memory slots directly coupled to the input/output expander, the random access memory controller being configured to control a chipset attached random access memory installed in the one or more chipset attached random access memory slots, the chipset attached random access memory separate from the system memory.

12. The system of claim 11, wherein the one or more system memory slots include a first set of one or more dynamic random access memory slots and the one or more chipset attached random access memory slots include a second set of one or more dynamic random access memory slots.

13. The system of claim 12, wherein the first set of one or more dynamic random access memory slots includes a first version of double data rate random access memory slots and the second set of one or more dynamic random access memory slots includes a second version of double data rate random access memory slots.

14. The system of claim 13, wherein the first version of double data rate random access memory slots includes an improved version of the second version of double date rate random access memory slots.

15. The system of claim 11, the input/output expander further comprising an input/output controller coupled to a chipset attached hard disk drive, and the chipset attached random access memory and the chipset attached hard disk drive collectively operating as a tiered storage solution accessed by the processing unit via the input/output expander.

16. The system of claim 15, further comprising the input/output controller being coupled to a chipset attached nonvolatile memory, and the chipset attached random access memory, the chipset attached nonvolatile memory, and the chipset attached hard disk drive collectively operating as the tiered storage solution accessed by the processing unit via the input/output expander.

17. A method comprising:
executing, by a processing unit, an operating system of a device;
receiving, at an input/output expander, access requests communicated from the processing unit to read data from a chipset attached random access memory directly coupled to the input/output expander, the access requests being separate from requests associated with the operating system, the chipset attached random access memory separate from a system memory of the device;
reading, by a controller of the input/output expander, data from a chipset attached random access memory directly coupled to the input/output expander in accordance with the access requests; and
responding, by the controller of the input/output expander, to the access requests based on the data read from the chipset attached random access memory.

18. The method of claim 17, the access requests further including requests to write data to the chipset attached random access memory, the method further comprising:
writing data to the chipset attached random access memory directly coupled to the input/output expander in accordance with the access requests; and
responding to the access requests based on the data written to the chipset attached random access memory.

19. The method of claim 17, wherein the chipset attached random access memory is part of a tiered storage solution that includes the chipset attached random access memory, a chipset attached nonvolatile memory, and a chipset attached disk drive.

20. The method of claim 19, further comprising presenting the tiered storage solution to the operating system running on the device as a single storage device.

* * * * *